(12) United States Patent
Alcantar et al.

(10) Patent No.: US 10,660,315 B1
(45) Date of Patent: May 26, 2020

(54) SCALING-UP OFF-FLAVOR COMPOUND DEGRADATION USING AQUACULTURE REACTING CANISTER TECHNOLOGY

(71) Applicants: Norma A. Alcantar, Tampa, FL (US); Daniela Miranda de Lima Stebbins, St. Petersburg, FL (US); Kevan Main, Tampa, FL (US)

(72) Inventors: Norma A. Alcantar, Tampa, FL (US); Daniela Miranda de Lima Stebbins, St. Petersburg, FL (US); Kevan Main, Tampa, FL (US)

(73) Assignee: University of South Florida, Tampa, FL (US)

( * ) Notice: Subject to any disclaimer, the term of this patent is extended or adjusted under 35 U.S.C. 154(b) by 0 days.

(21) Appl. No.: 15/817,915

(22) Filed: Nov. 20, 2017

Related U.S. Application Data

(60) Provisional application No. 62/424,102, filed on Nov. 18, 2016.

(51) Int. Cl.
| | | |
|---|---|---|
| *C02F 1/32* | (2006.01) |
| *A01K 63/04* | (2006.01) |
| *C02F 1/72* | (2006.01) |
| *C02F 103/20* | (2006.01) |
| *C02F 101/32* | (2006.01) |

(52) U.S. Cl.
CPC .............. *A01K 63/045* (2013.01); *C02F 1/32* (2013.01); *C02F 1/725* (2013.01); *C02F 2101/32* (2013.01); *C02F 2103/20* (2013.01); *C02F 2305/10* (2013.01)

(58) Field of Classification Search
CPC .... C02F 1/467; C02F 1/32; C02F 1/72; C02F 103/06; C02F 9/00; C02F 1/30; C02F 1/36; C02F 1/78; C02F 1/68; H01G 9/20; Y02W 10/37
See application file for complete search history.

(56) References Cited

FOREIGN PATENT DOCUMENTS

| | | | |
|---|---|---|---|
| CN | 202021048 U | * | 11/2011 |
| KR | 20020050393 A | * | 6/2002 |

OTHER PUBLICATIONS

CN-202021048-U, CN; Lingping Zhuang English translation (Year: 2011).*
KR-20020050393-A, Jun. 2002 Kim Si Hwan English translation (Year: 2002).*
Norma A. Alcantar, Removal of Off-Flavor Compounds in Aquaculture Food Products: Optimizing New Techniques for Sustainable Aquaculture Systems, Final Academic Progress Report, Dec. 2013, pp. 1-71, Fresh From Florida.

* cited by examiner

*Primary Examiner* — Cameron J Allen
(74) *Attorney, Agent, or Firm* — Steven M. Forte; Nilay J. Choksi; Smith & Hopen, P.A.

(57) ABSTRACT

A catalytic reactor using catalyst-coated optical fiber technology that will allow the control of light and its emission mode to quantitatively optimize catalytic degradation of off-flavor compounds. This degradation can be greatly enhanced by increasing the surface area of the catalyst. Coating individual transparent optical fibers and aligning them in a canister configuration allows the treatment of large volumes of water in portable and scalable reactors.

12 Claims, 22 Drawing Sheets

SCALING-UP OFF-FLAVOR COMPOUND DEGRADATION USING AQUACULTURE REACTING CANISTER TECHNOLOGY

CROSS-REFERENCE TO RELATED APPLICATIONS

This nonprovisional application is a continuation of and claims priority to U.S. Provisional Patent Application No. 62/424,102, entitled "Scaling-Up Off-Flavor Compound Degradation Using Aquaculture Reacting Canister Technology", filed Nov. 18, 2016, the entirety of which is incorporated herein by reference.

BACKGROUND OF THE INVENTION

1. Field of the Invention

This invention relates, generally, to aquafarming. More specifically, it relates to the removal of off-flavor compounds in recirculating aquaculture systems.

2. Brief Description of the Prior Art

Conventional technologies that have had success in removing organics from water involve the fast photocatalytic breakdown of off-flavor compounds such as 1,10-dimethyl-trans-9-decalol (Geosmin, GSM) and 2-methylisoborneol (MIB). However, such compounds penetrate fish tissue during fish food culture using recirculating aquaculture systems (RAS), negatively impacting its fresh flavor and, thereby, its market value.

More specifically, the success of fish aquaculture relies on improving harvest schedules and the quality of the product. However, when RAS's are in use, culture fish can acquire a musty and earthy flavor that is attributable to the presence of off-flavor compounds. During the culture time, GSM and MIB accumulate in the fatty tissue of fish, compromising their freshness and delaying harvesting time by up to 25%-54%. Removing off-flavor compounds would eliminate the need of depuration schedules and, consequently, increasing revenue. However, this has not been accomplished in the art.

Accordingly, what is needed is a system that is capable of removing nearly 100% of MIB and GSM without delaying freshness or delaying harvesting time. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a", "an", and "the" include plural referents unless the content clearly dictates otherwise. As used in this specification and the appended claims, the term "or" is generally employed in its sense including "and/or" unless the context clearly dictates otherwise.

The current inventors have studied the degradation of GSM and MIB previously, for example in "Removal of Off-Flavor Compounds in Aquaculture Food Products: Optimizing New Techniques for Sustainable Aquaculture Systems", Final Academic Progress Report, December 2013, pp. 1-71, Fresh From Florida, which is incorporated herein by reference in its entirety.

In an embodiment, the current invention is a catalytic reactor using catalyst-coated optical fiber technology that will allow the control of light and its emission mode to quantitatively optimize catalytic degradation of off-flavor compounds. This degradation can be greatly enhanced by increasing the surface area of the catalyst. Coating individual transparent optical fibers and aligning them in a canister configuration allows the treatment of large volumes of water in portable and scalable reactors.

Methods

The current methodology proposes the design of a technology capable of removing off-flavor compounds at a larger scale (treating approximately 50-60 gpm) for RAS or intensified systems used by various aquaculture operations.

Figure 4:
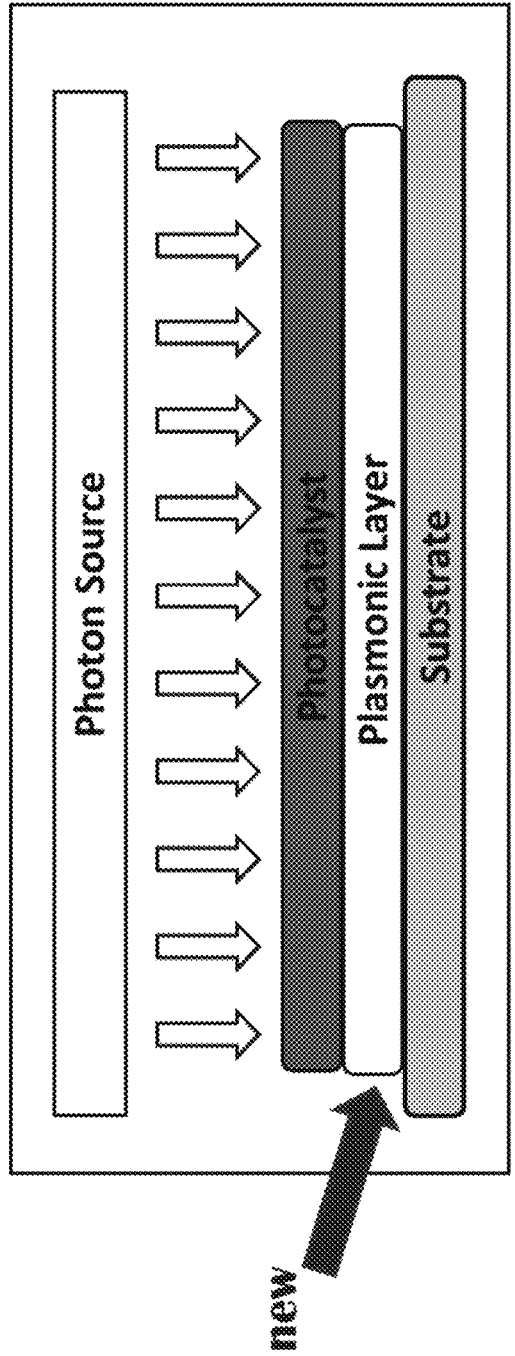
FIG. 4 is a schematic depicting improvement of the photocatalytic process.
Figure 5A:
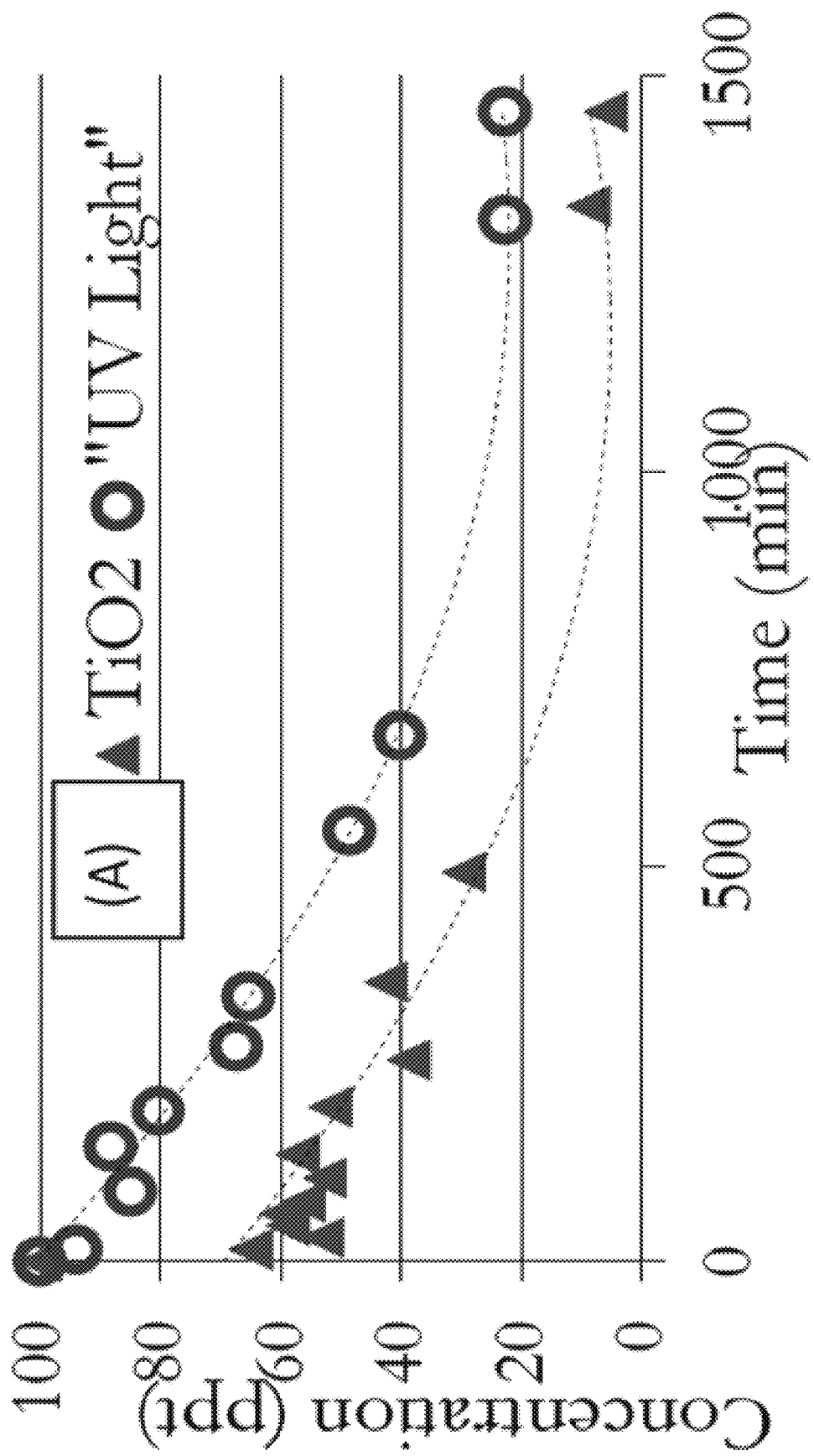
FIGS. 5A-5B depicts Geosmin degradation with the $TiO_2$ photocatalyst (FIG. 5A) and $TiO_2$+new plasmonic layer (FIG. 5B).
Figure 5B:
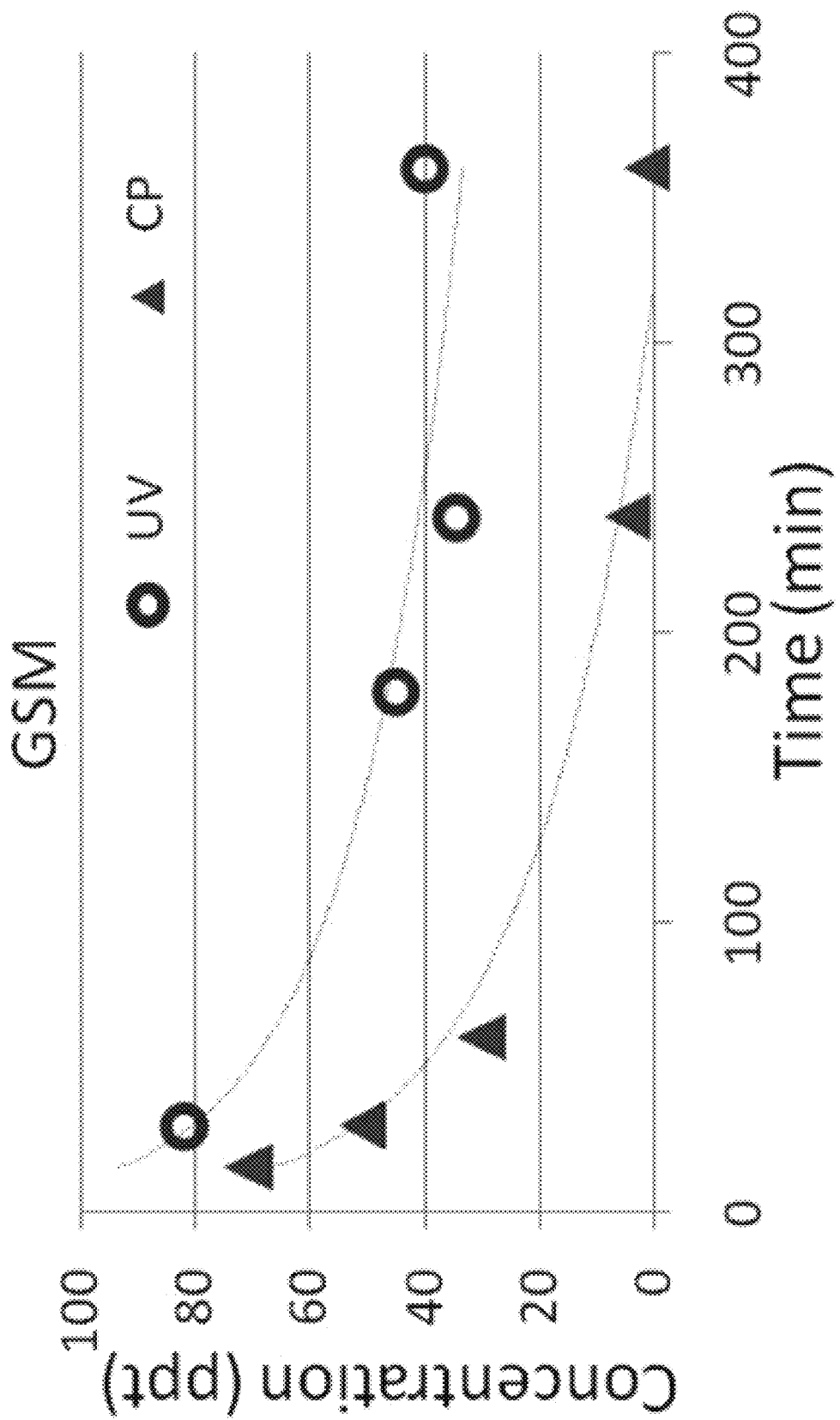
Figure 6A:
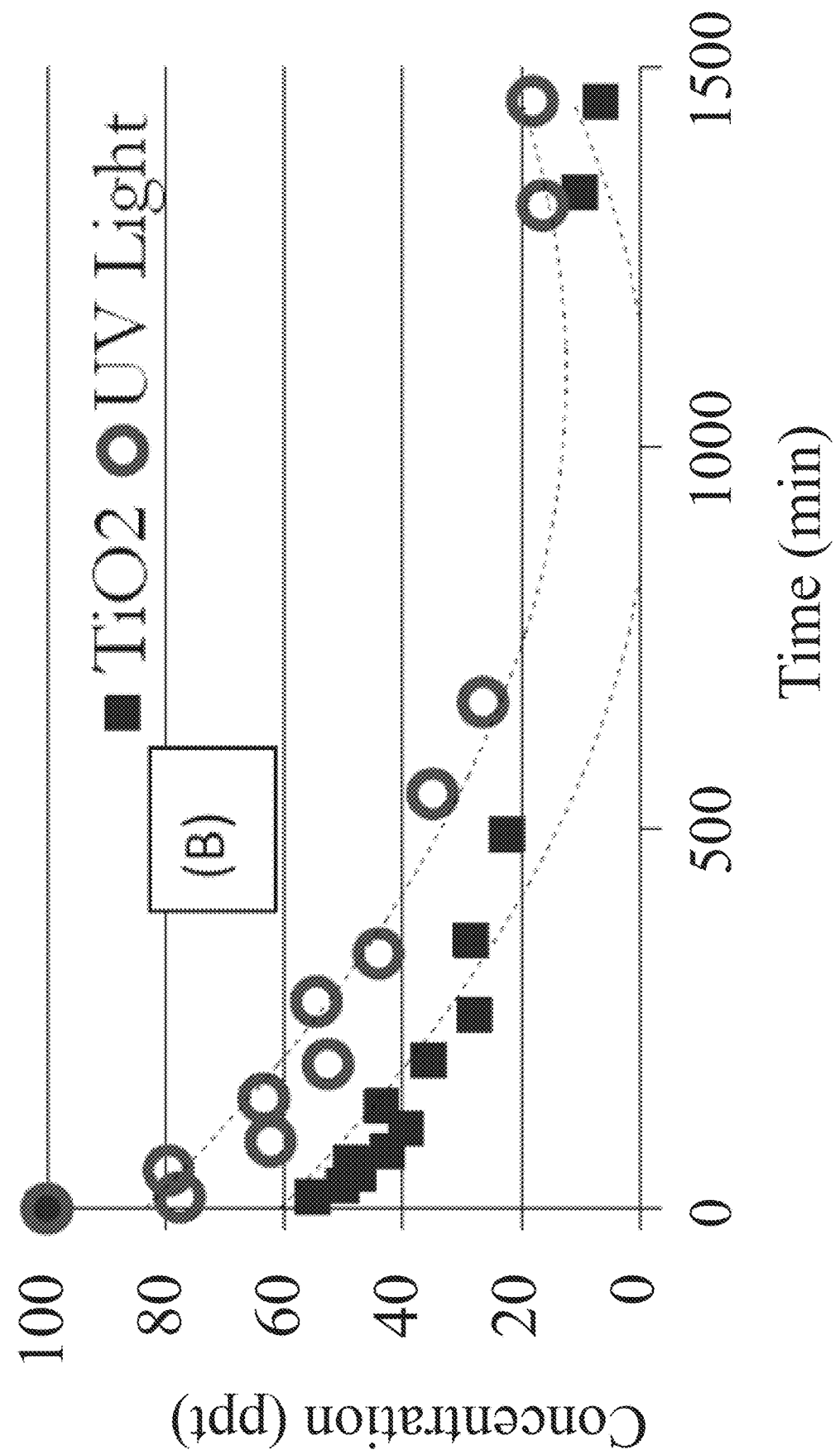
FIGS. 6A-6B depicts MIB degradation with the $TiO_2$ photocatalyst (FIG. 6A) and $TiO_2$+new plasmonic layer (FIG. 6B).
Figure 6B:
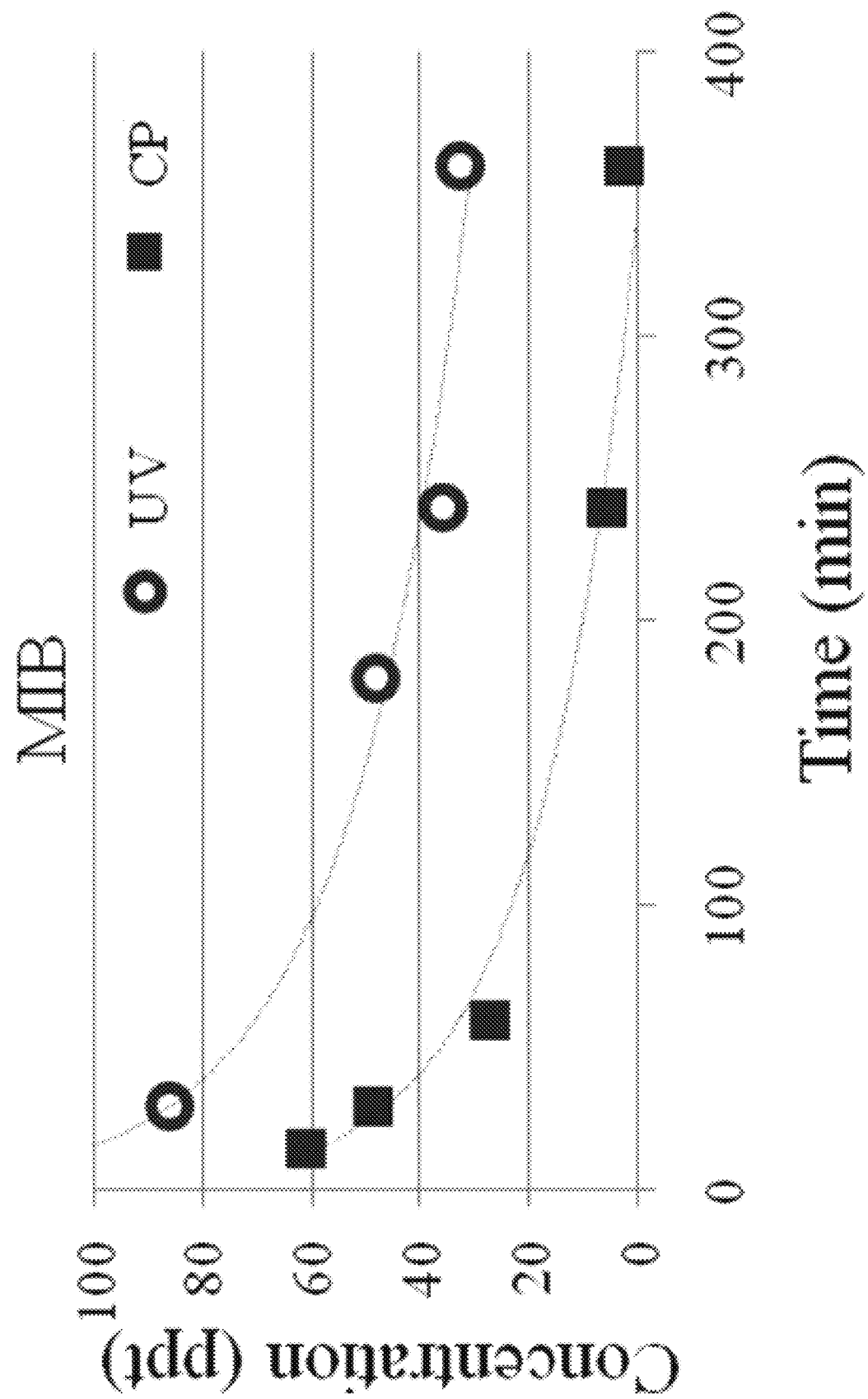

Catalyst-coated fiber optics are proposed herein to greatly enhance the surface contact area and degradation action of GSM and MIB via an advance oxidation process (AOP). Fiber optics are now an affordable technology and have greatly enhanced electronic communications and improved illumination technologies. An aquaculture reacting canister (ARC) will be developed herein with flexible, transparent fibers coated with immobilized $TiO_2$ photo-catalyst that will be slurry-spray-coated onto the fibers in two different configurations, permitting optimization of its effectiveness. See FIG. 4. In both configurations, a plasmonic layer that includes yttrium aluminum garnet (YAG) nanoparticles is positioned between the photo-catalyst and the substrate as shown in FIG. 4.

The coating process has been studied in the current inventors' previous research projects, and it has been determined that this technique is quite robust for underwater applications and where the catalyst does not leach out from the substrate. The first coating method involves covering entire transparent glass fibers with the catalyst. These fibers can be packed and intercalated with uncoated fibers emitting at the wavelength for the catalyst to activate its organic degradation potential. Light inside the fibers will undergo total internal reflection, so the fibers will act as waveguides and propagate in multiple-mode configurations to enhance intensity and light reflection.

In the second coating method, a mesh can be used to mask the catalyst coating area, but all fibers would be packed together.

The effect of having light emitting through naked fibers into the coated fibers can be compared against the effect of having attenuated light from within the optical fiber to reflect on the catalyst-coated surface area. The effect that each method will have on the degradation of GSM and MIB can be a benchmark for determining which technique is more effective, so that bundles of fibers can be incorporated into canisters that allow the flow needed for treating large amounts of water from the purging tanks.

Figure 1:
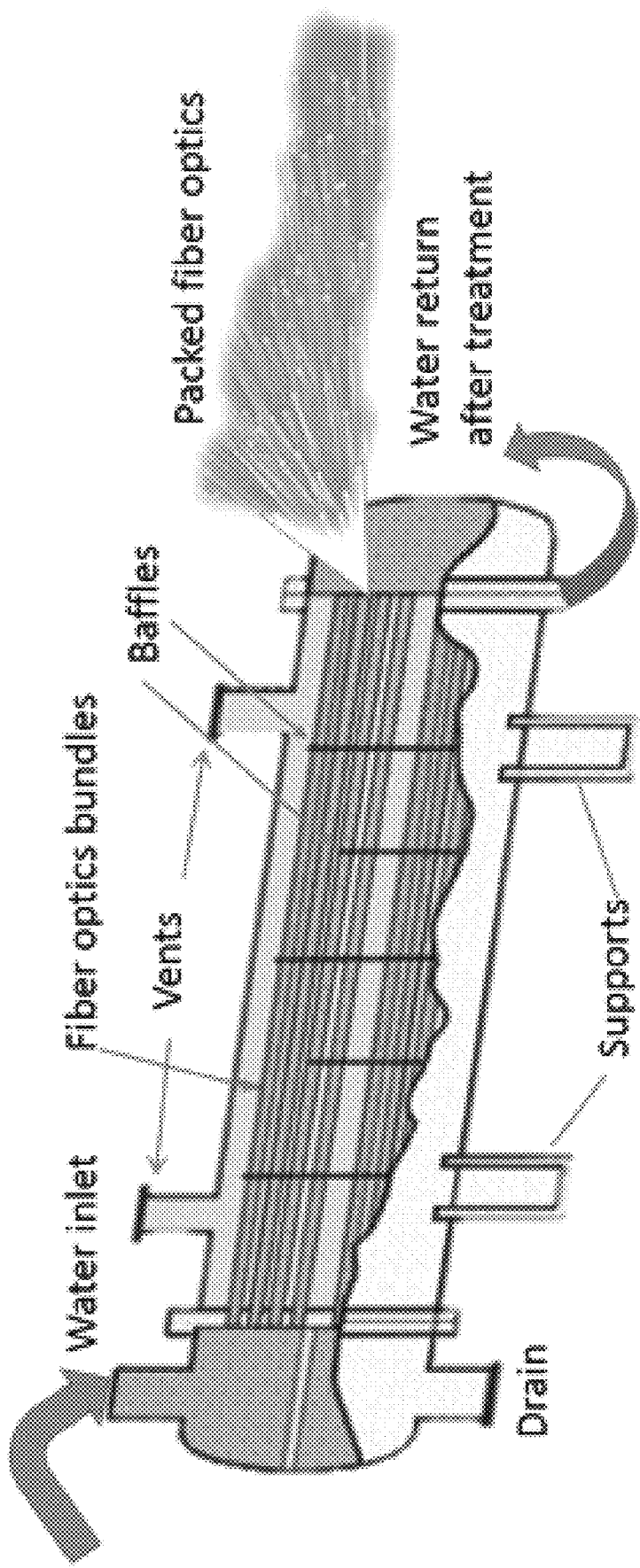
FIG. 1 is a schematic representation of ARC prototype for catalytic degradation of GSM and MIB.
Figure 2:
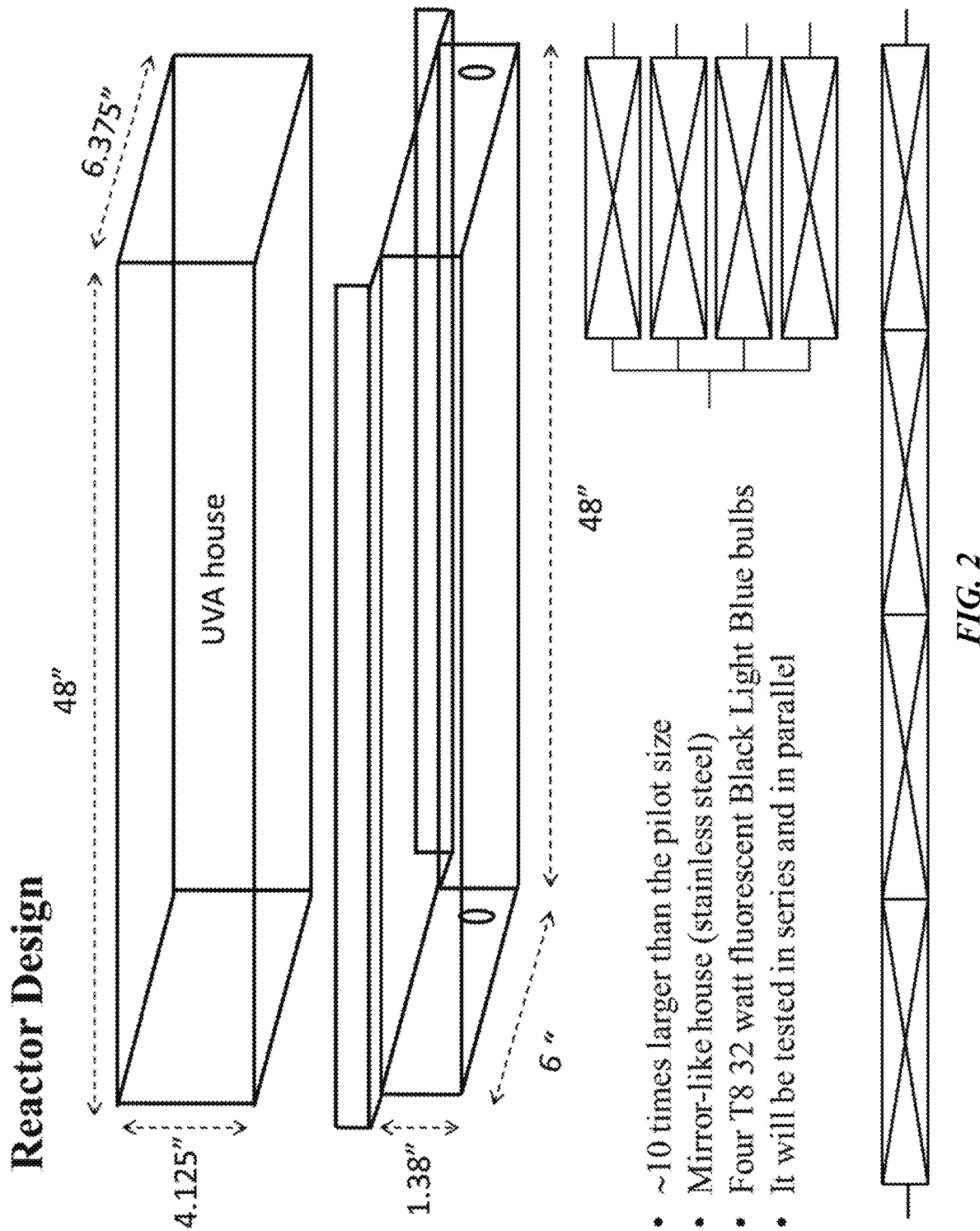
FIG. 2 is a schematic of the reactor design, according to an embodiment of the current invention.
Figure 3A:
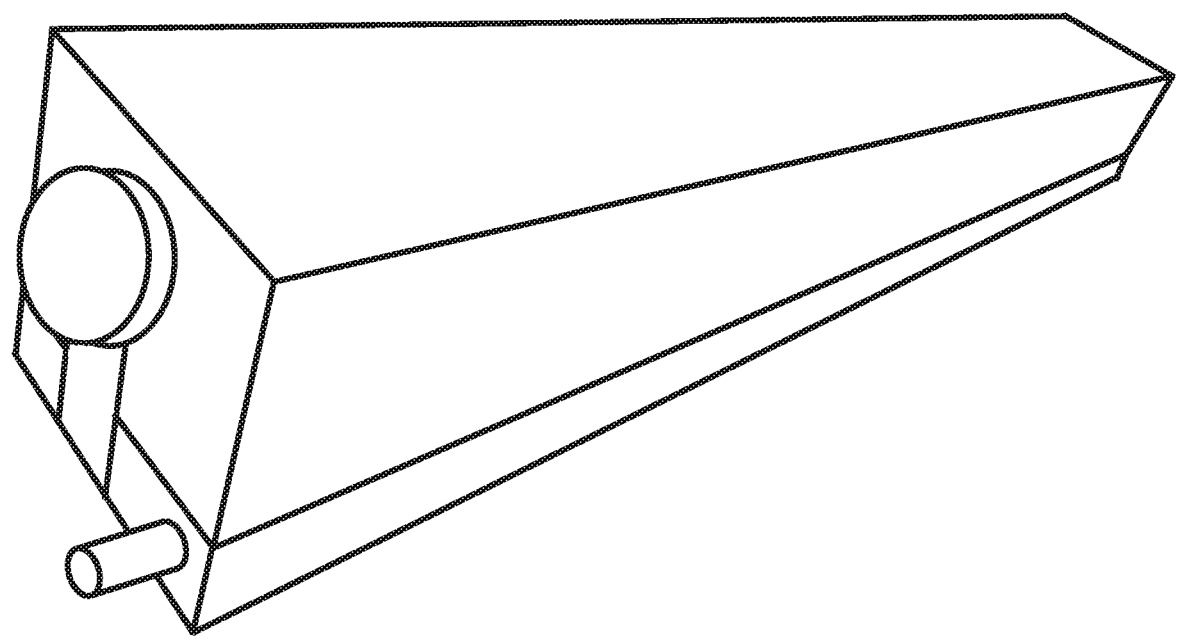
FIGS. 3A-3B are photos of a reactor, according to an embodiment of the current invention.
Figure 3B:
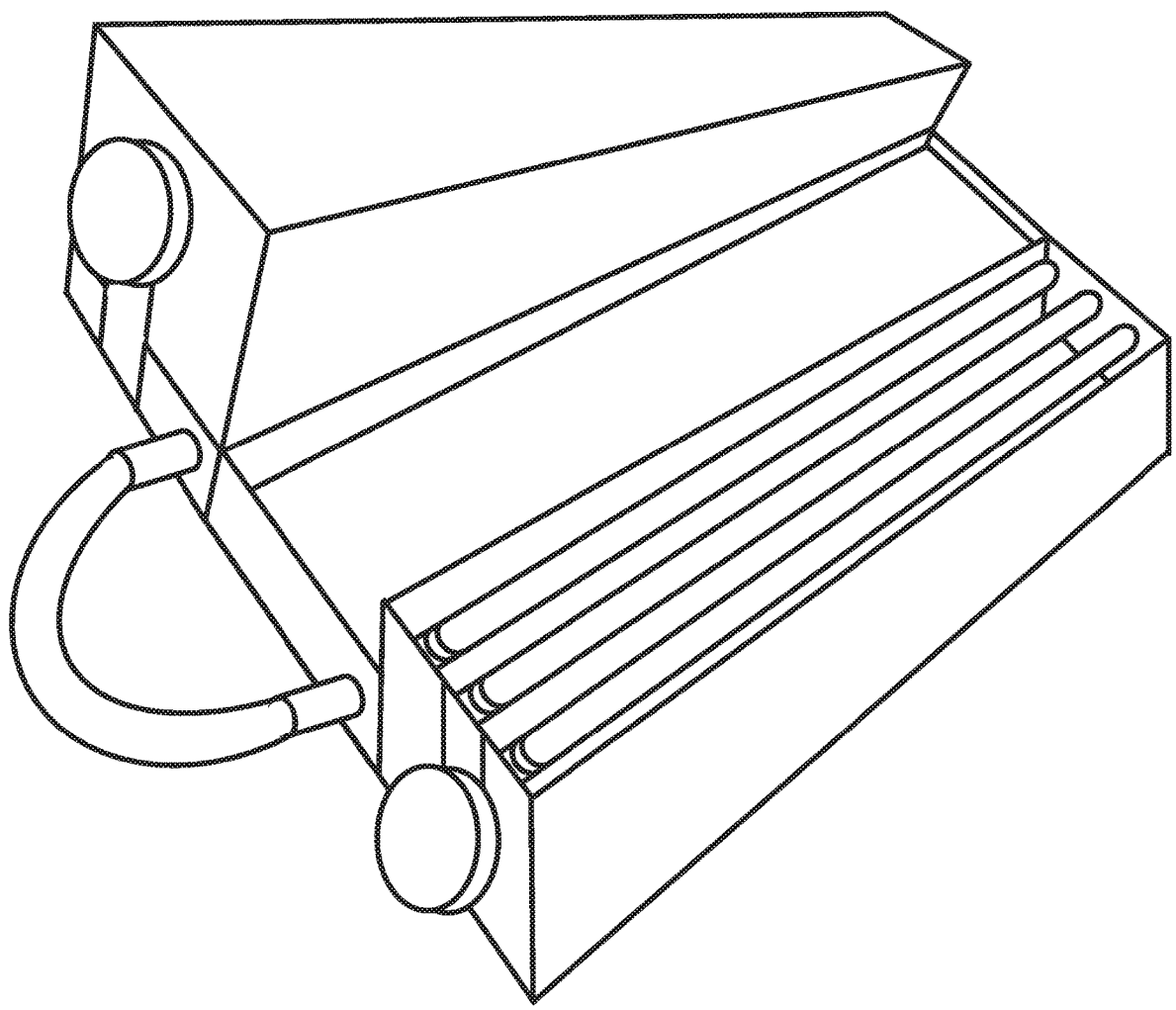
Figure 7:
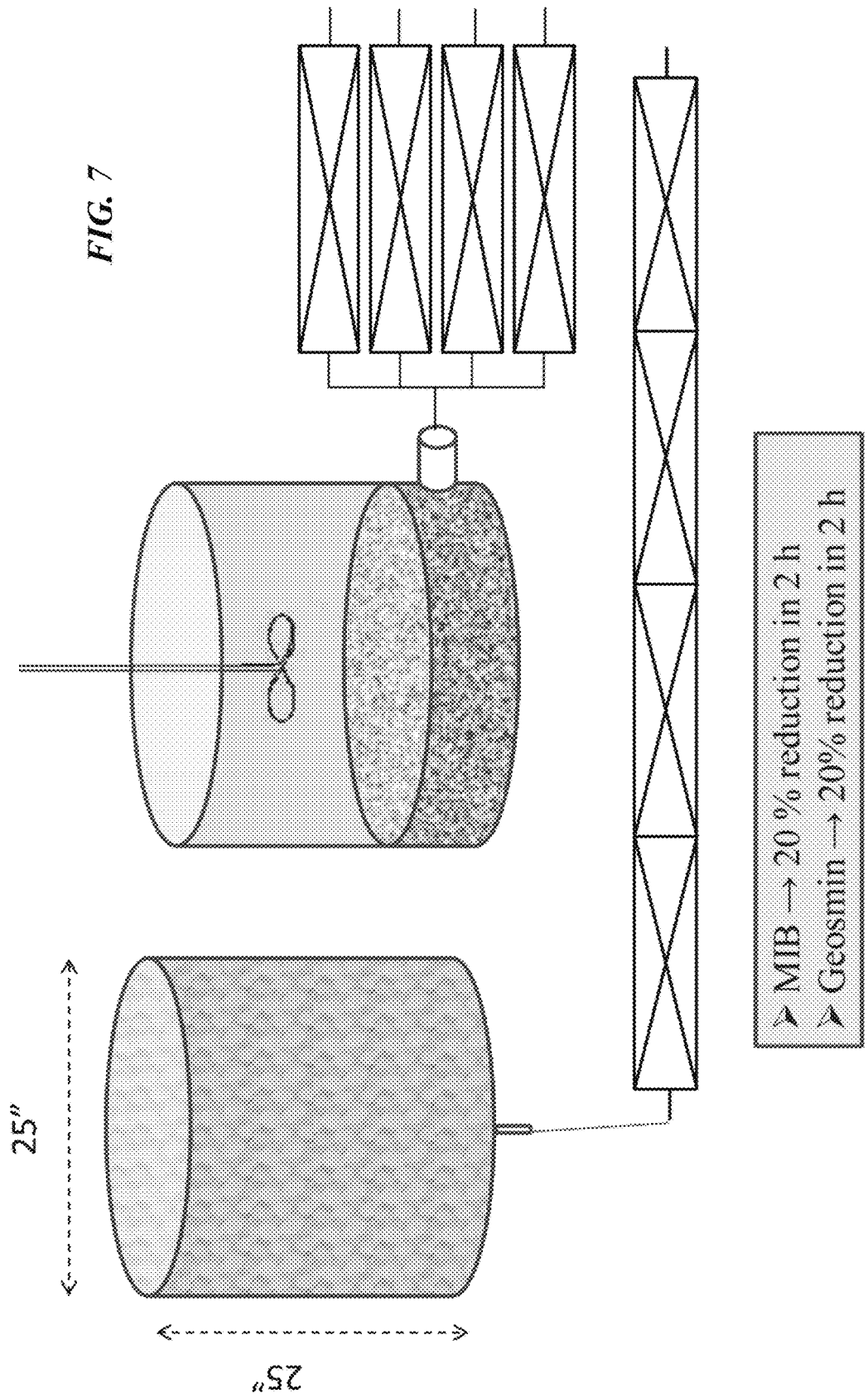
FIG. 7 depicts the cactus mucilage (beads column×large size container).

Due to the fact that the thickness of fiber optics is not larger than a human hair, they can be coated effectively with this technique and packed into canisters, as shown in FIG. 1. See also FIG. 7. The water can be continuously recirculated and sampled at the vent outlets. In turn, an in situ off-flavor detection method using refractive index changes can be coupled with the ARC for improving its applicability. Baffles can be used to position and support the fiber bundles and restrict the water flow to increase the contact time inside the ARC. See FIGS. 1, 2, 3A, and 3B. The research parameters involved in the testing include the following variables:

Packing density of fibers
Staking of canisters
Position of baffles
Light intensity
Modulation and phase of light
Retention time
Volume
Reaction rate coefficient
Water pressure drop
Water flow patterns inside tank Theoretical models will be used to simulate the response on the performance of the ARC unit and their operating conditions. ASPEN PLUS, COMSOL (engineering design software), or other suitable software can be used to determine model parameters, initial conditions of operation, final concentrations, volumes, temperature, pressure, and flows. See FIGS. 5A-5B & 6A-6B for theoretical results.

Study/Example

Figure 8:
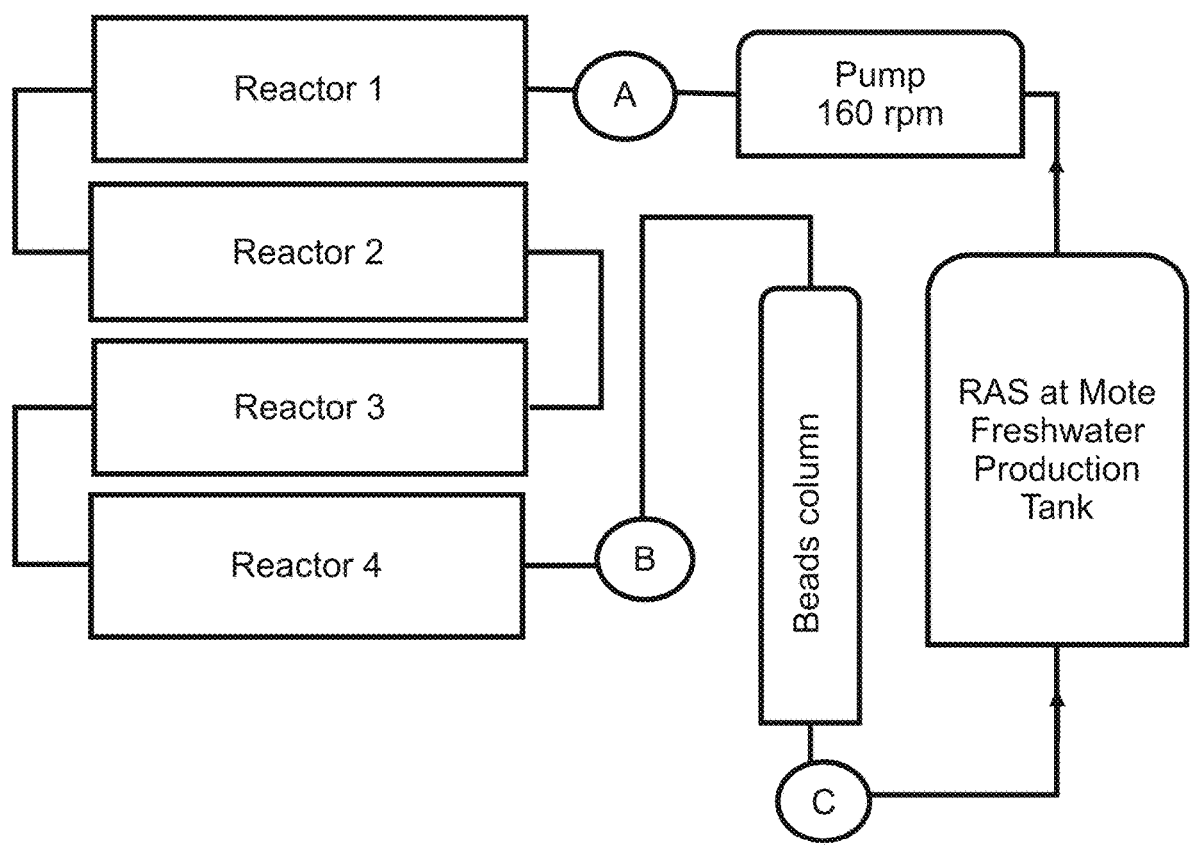
FIG. 8 is a schematic of the system connected to a production tank of recirculating freshwater system at Mote Marine Laboratory.
Figure 9:
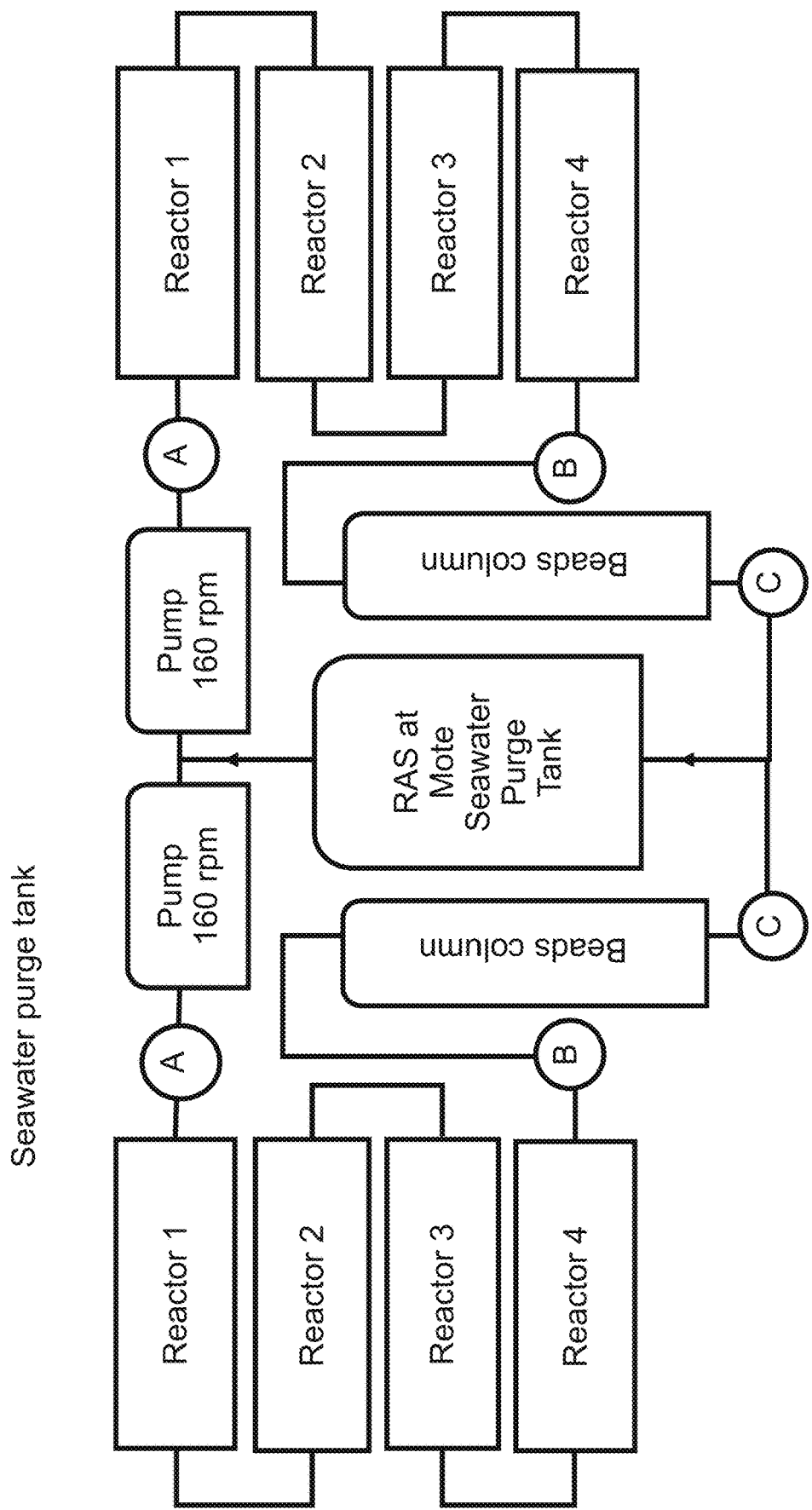
FIG. 9 is a schematic of the system connected to a purge tank of recirculating seawater system at Mote Marine Laboratory.
Figure 10A:
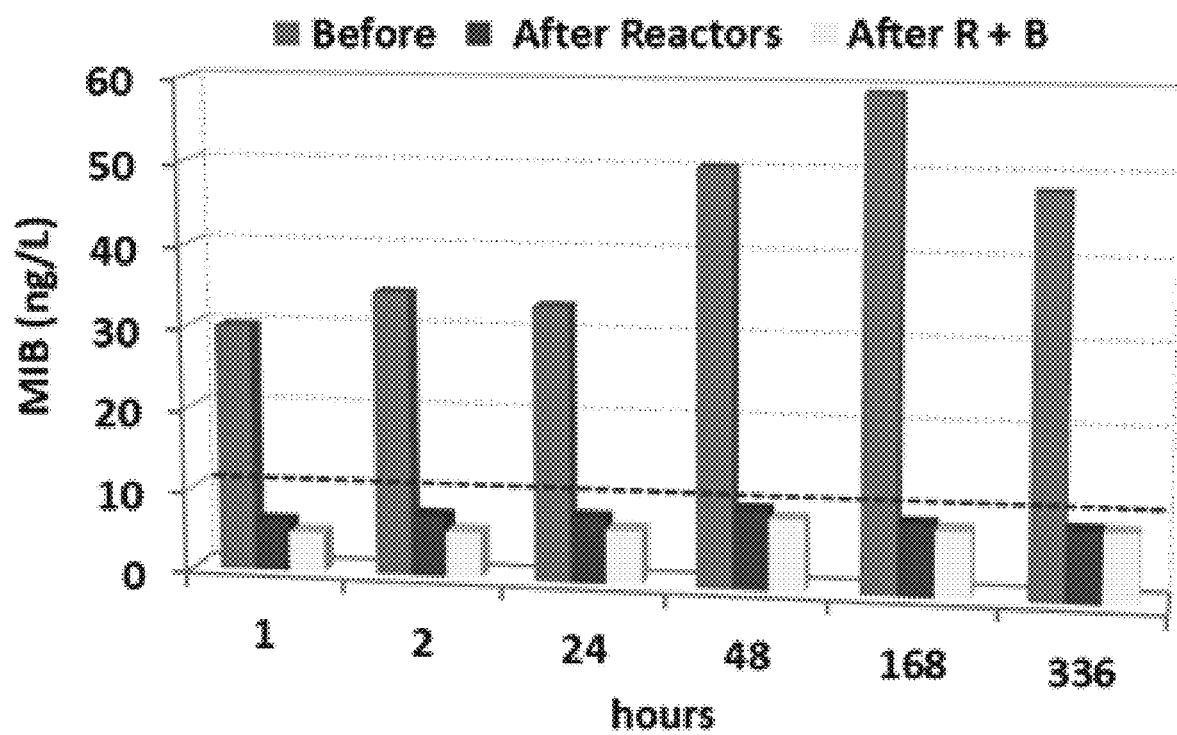
FIG. 10A depicts MIB before (left bars) and after treatment with system connected, middle bars indicate concentrations after reactors, and right bars indicate concentrations after the entire system. The system was connected to a purge tank of recirculating freshwater system at Mote Marine Laboratory.
Figure 10B:
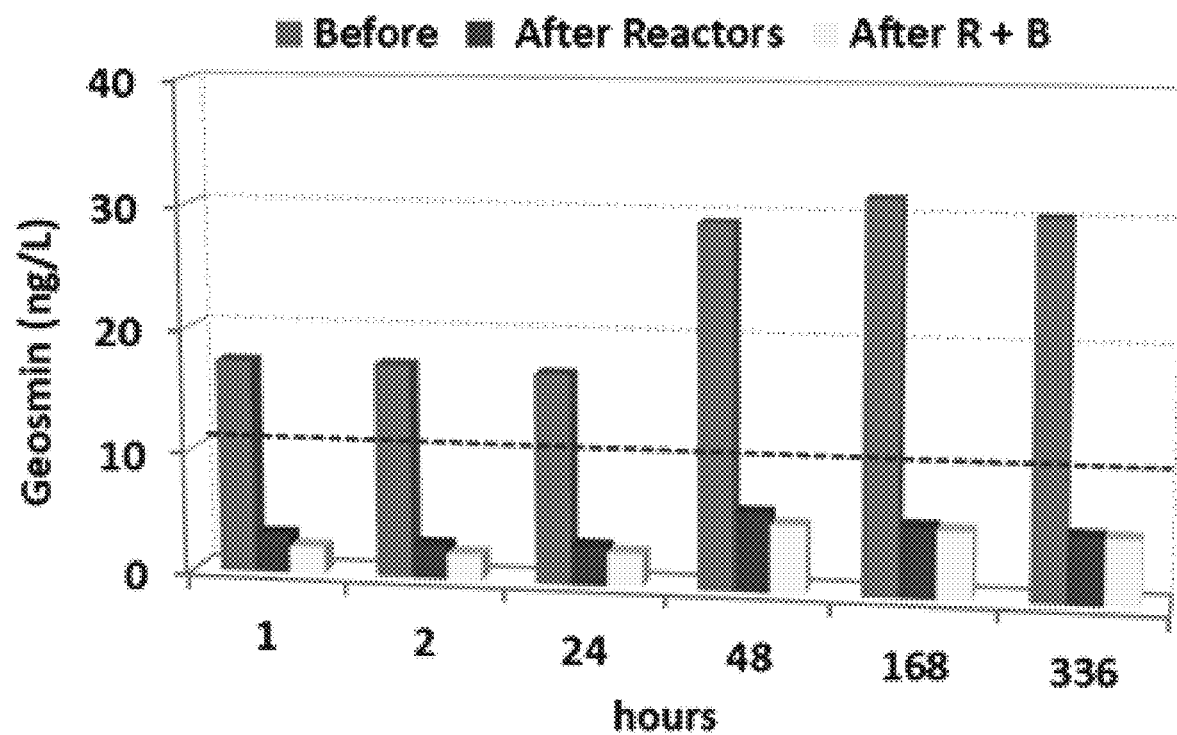
FIG. 10B depicts Geosmin before (left bars) and after treatment with system connected, middle bars indicate concentrations after reactors, and right bars indicate concentrations after the entire system. The system was connected to a purge tank of recirculating freshwater system at Mote Marine Laboratory.
Figure 10C:
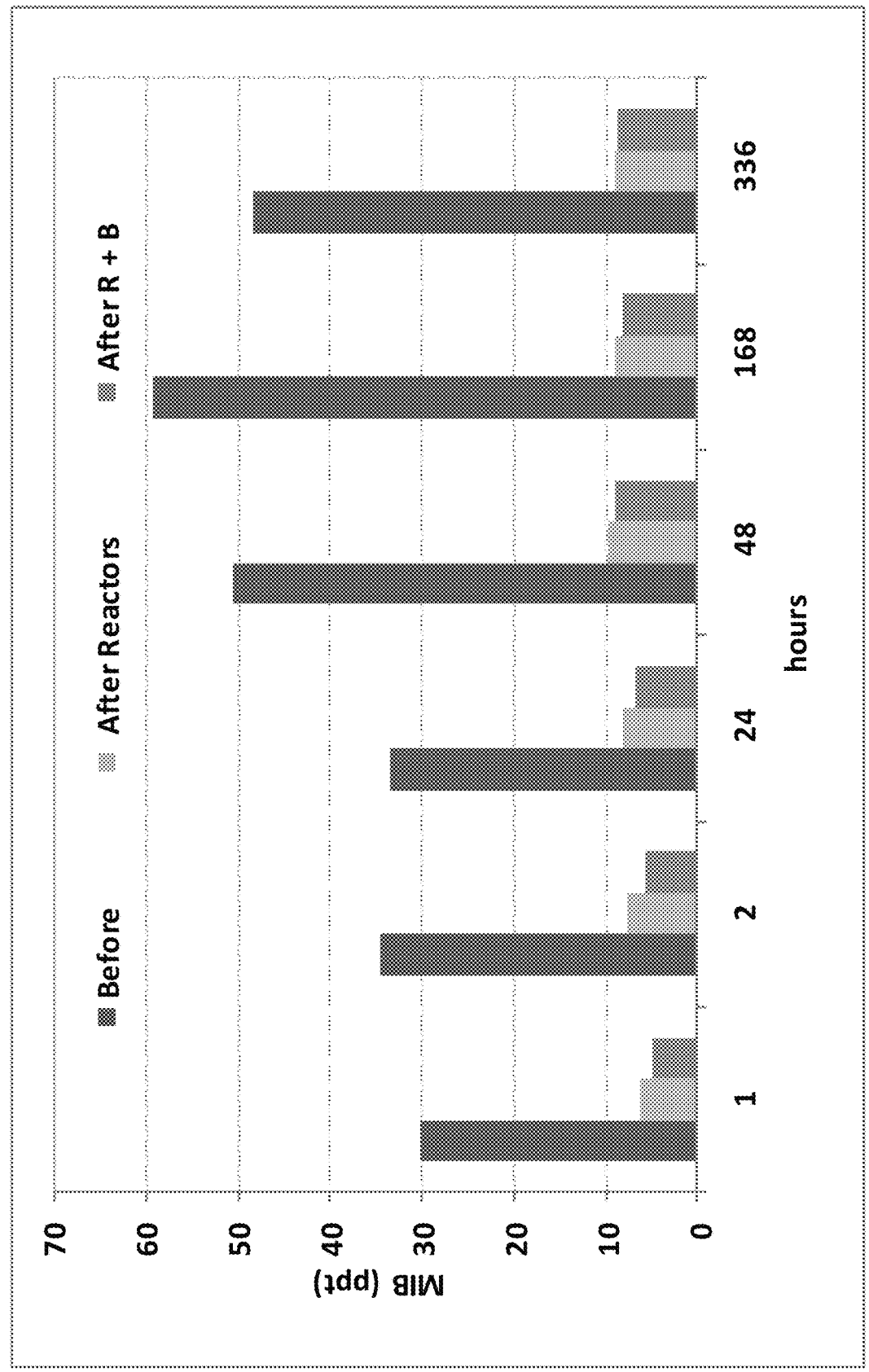
FIG. 10C depicts MIB before (left bars) and after treatment with system connected, middle bars indicate concentrations after reactors, and right bars indicate concentrations after the entire system. The system was connected to a purge tank of recirculating freshwater system at Mote Marine Laboratory.
Figure 10D:
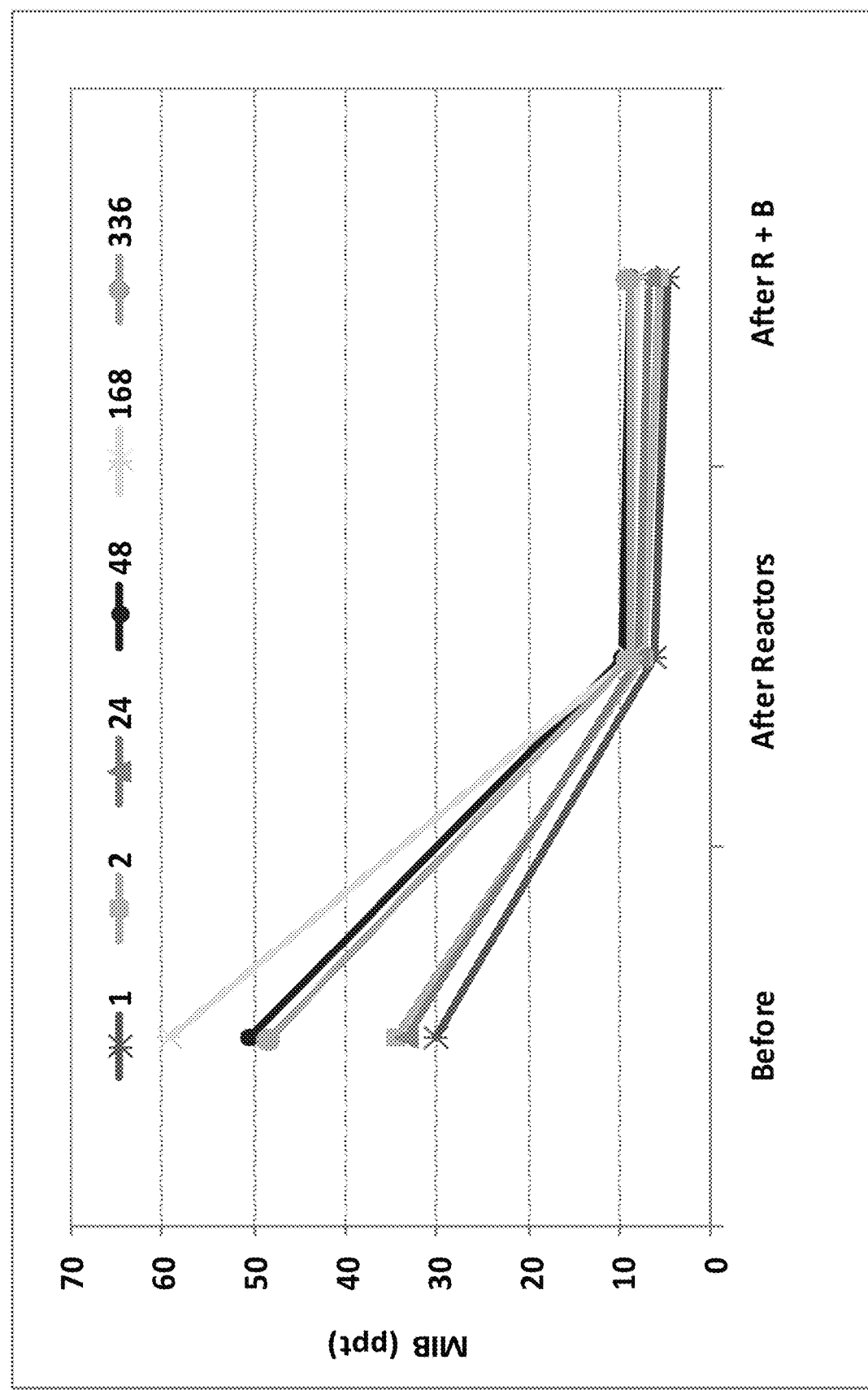
FIG. 10D is a line graph illustrating MIB before and after treatment with system connected, concentrations after reactors, and concentrations after the entire system. The system was connected to a purge tank of recirculating freshwater system at Mote Marine Laboratory.

The system was tested on recirculating aquaculture system at Mote Marine Laboratory under two different conditions. A set of 4 reactors and 1 biobeads column was connected to a production tank of recirculating freshwater system and it was continuously running and monitored for 2 weeks (see FIG. 8). Another set of 8 reactors and 2 biobeads columns were connected to a purge tank of recirculating seawater system and continuously run and monitored for 30 days (see FIG. 9).

In the production tanks, the concentration of Geosmin and MIB was considerable higher than concentrations on the purge tanks. As well as, in the productions tanks there was a continuous production of off-flavors, and the initial concentrations before the system had a natural variation along the evaluated time, MIB (30 to 60 ng/L) and Geosmin (15 to 35 ng/L). Initial concentrations of MIB and Geosmin, on the purge tank were 5.1 to 1.7 ng/L and 1.3 to 0.1 ng/L, respectively.

Figure 11:
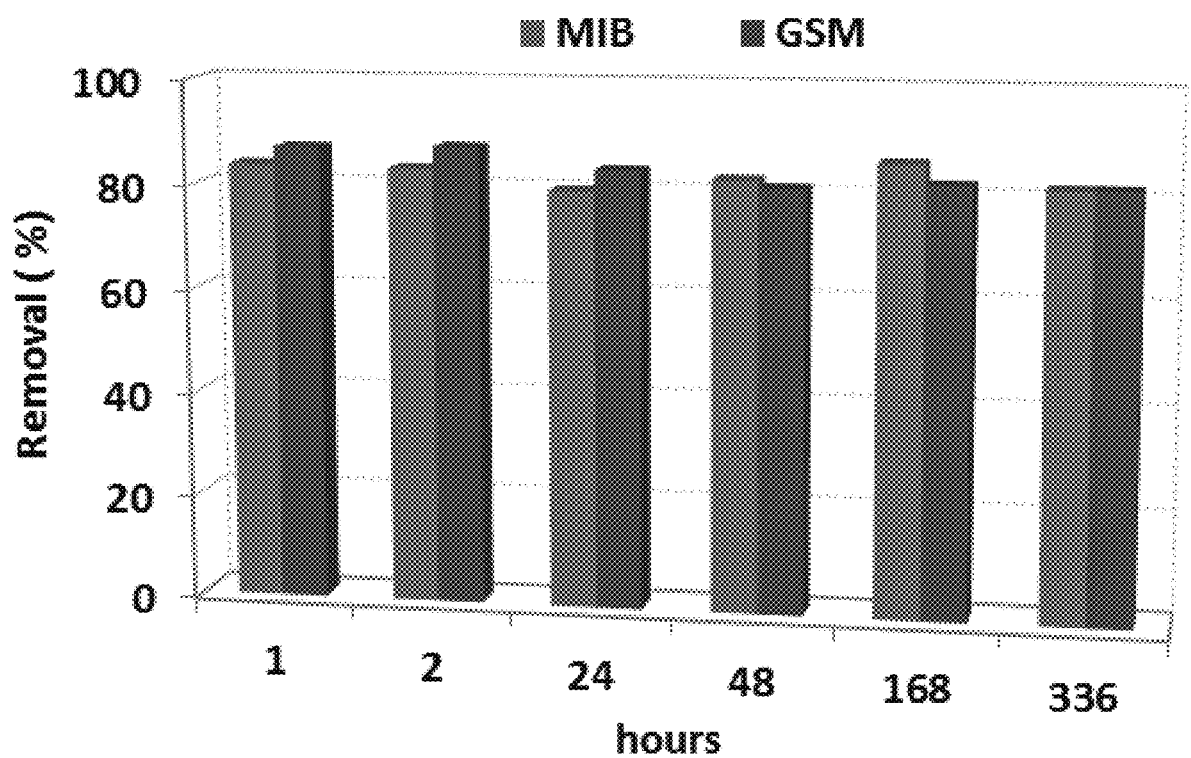
FIG. 11 depicts removal of MIB and Geosmin from a production tank of recirculating freshwater system at Mote Marine Laboratory after treatment with the system.

Even though the input concentrations were as high as 60 ng/L, the system was always able to keep the concentrations of MIB and Geosmin below 10 ng/L (FIGS. 10A-10D; Tables 1-2). During evaluation time, the removal percentage of MIB and Geosmin on the freshwater production tank was always equal or higher than 80% (FIG. 11; Table 3).

TABLE 1

Results:

| Sample | MIB ppt | GSM ppt |
|---|---|---|
| A1h1 | 29.0 | 17.2 |
| A2h1 | 31.1 | 17.4 |
| B1h1 | 6.3 | 3.8 |
| B2h1 | 5.9 | 2.4 |
| C1h1 | 4.7 | 2.6 |
| C2h1 | 5.0 | 1.8 |

TABLE 1-continued

Results:

| Sample | MIB ppt | GSM ppt |
|---|---|---|
| A1h2 | 34.9 | 15.9 |
| A2h2 | 34.1 | 18.8 |
| B1h2 | 8.5 | 2.7 |
| B2h2 | 6.5 | 2.7 |
| C1h2 | 6.3 | 2.4 |
| C2h2 | 5.1 | 1.8 |
| A1D1 | 30.4 | 14.3 |
| A2D1 | 36.3 | 19.7 |
| B1D1 | 8.9 | 3.0 |
| B2D1 | 7.2 | 3.3 |
| C1D1 | 6.7 | 2.7 |
| A1d2 | 53.4 | 30.3 |
| A2d2 | 47.4 | 28.5 |
| B1d2 | 9.5 | 6.6 |
| B2d2 | 9.9 | 6.2 |
| C1d2 | 8.6 | 5.4 |
| C2d2 | 9.0 | 5.7 |
| A1w1 | 62.7 | 34.1 |
| A2w1 | 56.0 | 29.0 |
| B1w1 | 9.8 | 5.6 |
| B2w1 | 7.9 | 6.1 |
| C1w1 | 7.8 | 5.8 |
| C1w2 | 8.6 | 5.4 |
| A1w2 | 46.5 | 27.1 |
| A2w2 | 50.0 | 33.6 |
| B1w2 | 8.4 | 5.9 |
| B2w2 | 9.2 | 5.2 |
| C1w2 | 8.6 | 5.4 |
| C2w2 | 8.9 | 5.6 |

TABLE 2

| | Average Concentration (ppt) | | | | | | | | | | | |
|---|---|---|---|---|---|---|---|---|---|---|---|---|
| sampling point | 1 | 1 | 2 | 2 | 24 | 24 | 48 | 48 | 168 | 168 | 336 | 336 |
| | MIB | GSM | MIB | GSM | MIB | GSM | MIB | GSM | MIB | GSM | MIB | GSM |
| Before | 30.1 | 17.3 | 34.5 | 17.3 | 33.4 | 17.0 | 50.4 | 29.4 | 59.3 | 31.6 | 48.3 | 30.3 |
| After Reactors | 6.1 | 3.1 | 7.5 | 2.7 | 8.1 | 3.2 | 9.7 | 6.4 | 8.9 | 5.8 | 8.8 | 5.6 |
| After R + B | 4.9 | 2.2 | 5.7 | 2.1 | 6.7 | 2.7 | 8.8 | 5.6 | 8.2 | 5.6 | 8.8 | 5.5 |
| | 83.8 | 87.2 | 83.5 | 87.7 | 79.9 | 83.9 | 82.5 | 81.1 | 86.2 | 82.3 | 81.9 | 81.9 |

TABLE 3

| | Removal (%) | | | | | | | | | | | |
|---|---|---|---|---|---|---|---|---|---|---|---|---|
| sampling point | after 1 hour | | after 2 hours | | after 1 day | | after 2 days | | after 1 week | | after 2 weeks | |
| | MIB | GSM | MIB | GSM | MIB | GSM | MIB | GSM | MIB | GSM | MIB | GSM |
| B after reactors | 79.6 | 82.1 | 78.3 | 84.3 | 75.8 | 81.4 | 80.7 | 78.3 | 85.1 | 81.6 | 81.7 | 81.7 |
| C after beads | 83.8 | 87.2 | 83.5 | 87.7 | 79.9 | 83.9 | 82.5 | 81.1 | 86.2 | 82.3 | 81.9 | 81.9 |
| Beads | 4.2 | 5.1 | 5.2 | 3.4 | 4.1 | 2.4 | 1.8 | 2.8 | 1.1 | 0.7 | 0.1 | 0.2 |

Figure 12A:
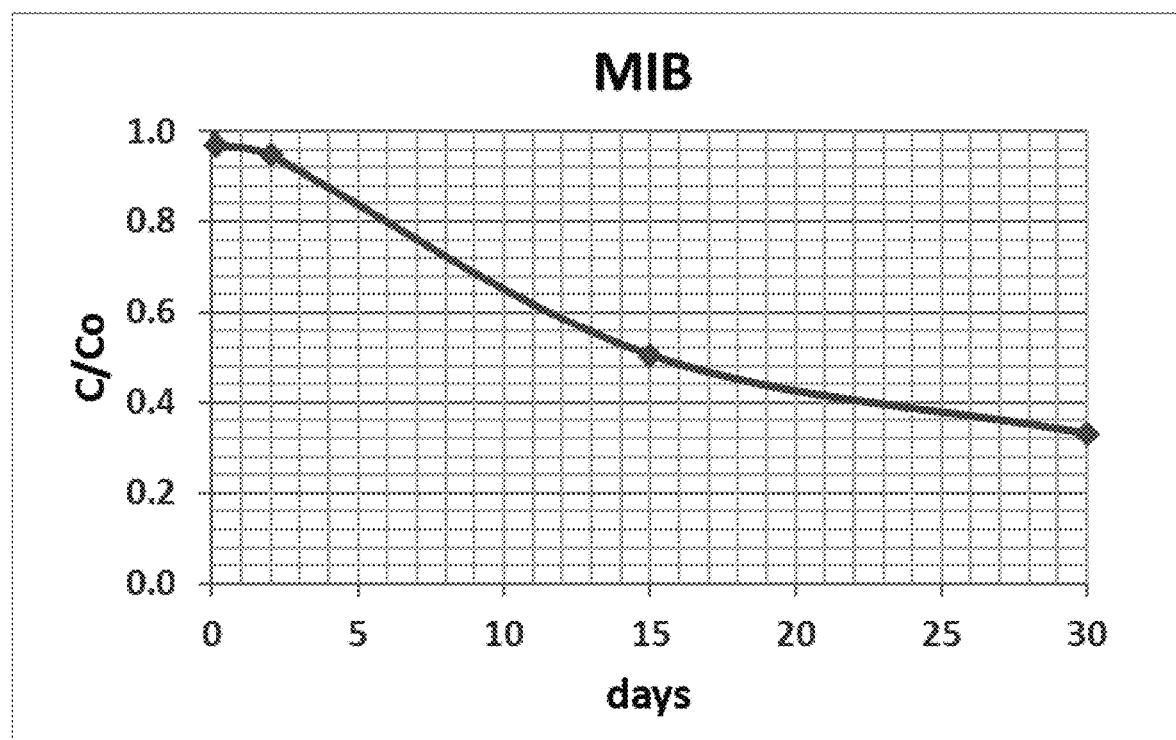
FIG. 12A depicts MIB normalized concentration prior to treatment with the system connected to a purge tank of recirculating seawater system at Mote Marine Laboratory.
Figure 12B:
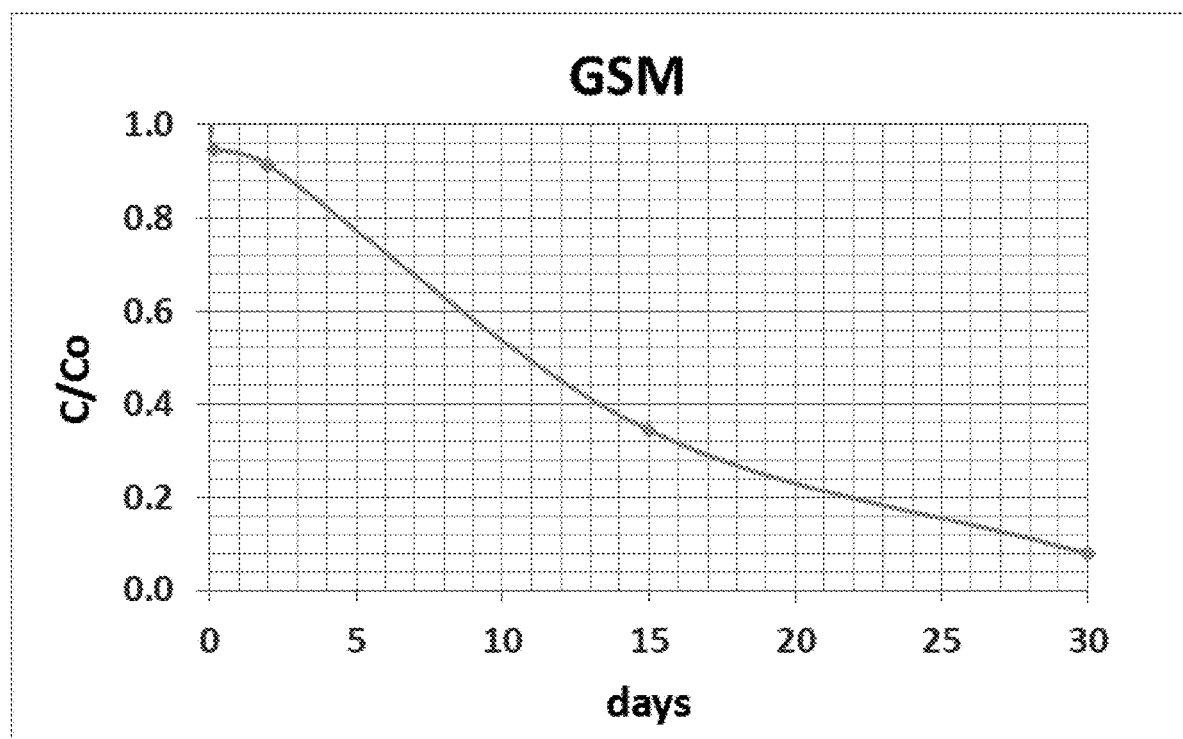
FIG. 12B depicts Geosmin normalized concentration prior to treatment with the system connected to a purge tank of recirculating seawater system at Mote Marine Laboratory.
Figure 12C:
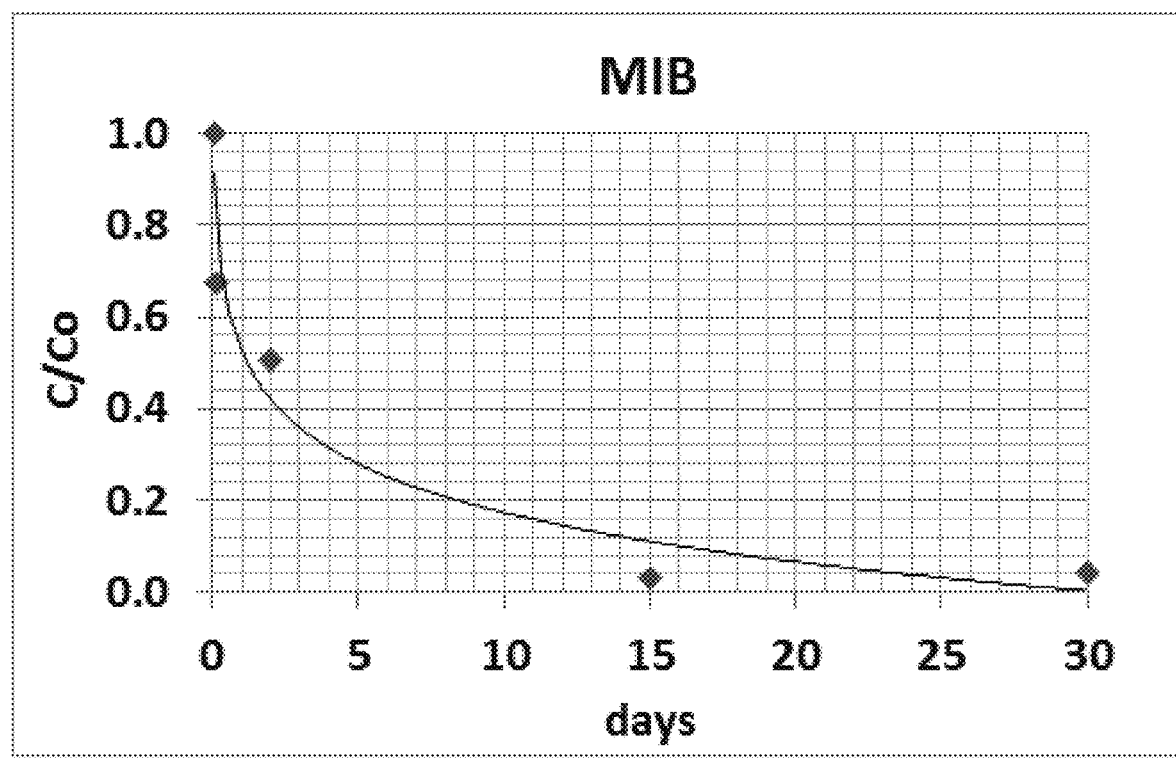
FIG. 12C depicts MIB normalized concentration after treatment with the system connected to a purge tank of recirculating seawater system at Mote Marine Laboratory.
Figure 12D:
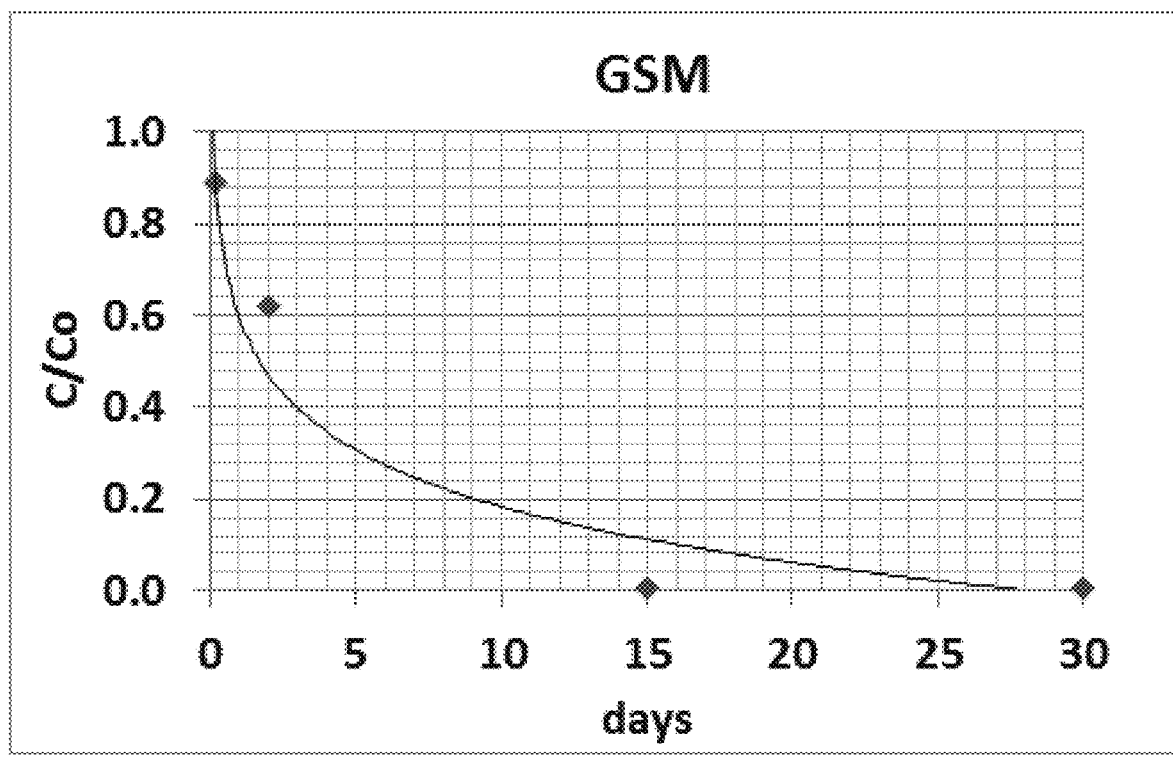
FIG. 12D depicts Geosmin normalized concentration after treatment with the system connected to a purge tank of recirculating seawater system at Mote Marine Laboratory.
Figure 13A:
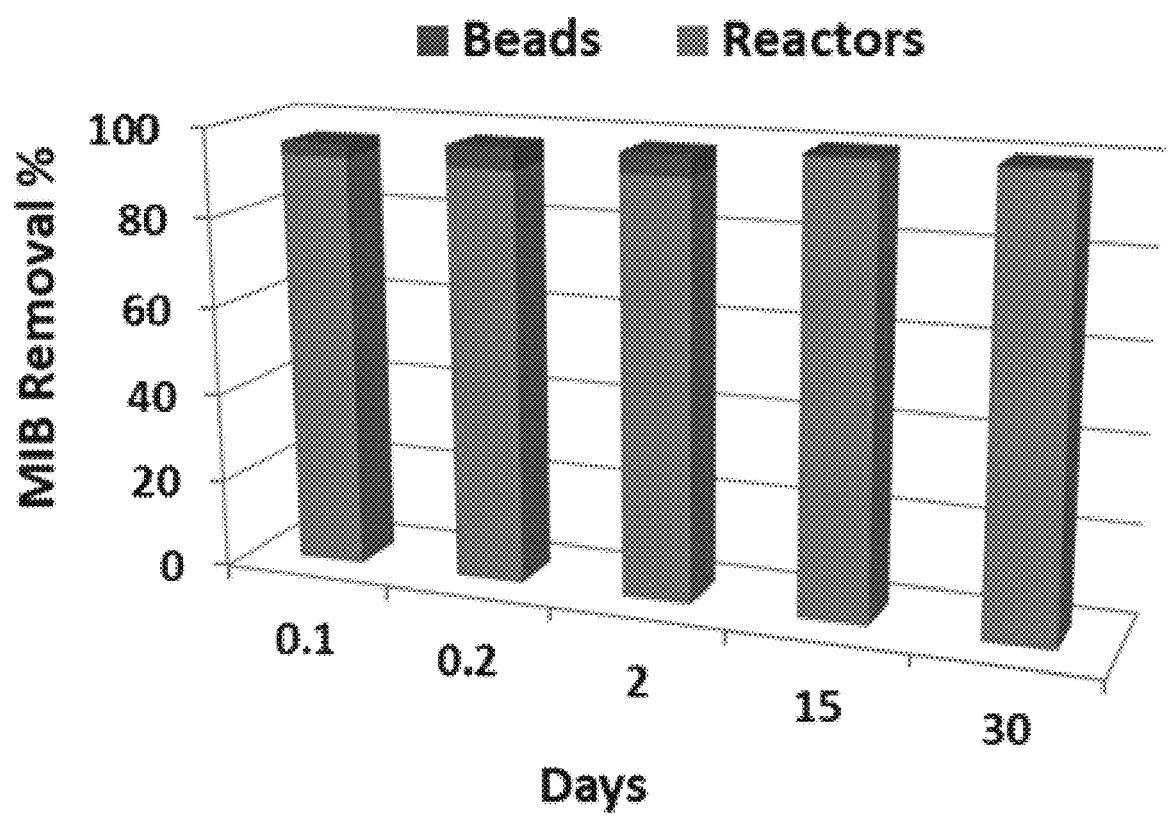
FIG. 13A depicts removal of MIB from a purge tank of recirculating seawater system at Mote Marine Laboratory after treatment with the current system.
Figure 13B:
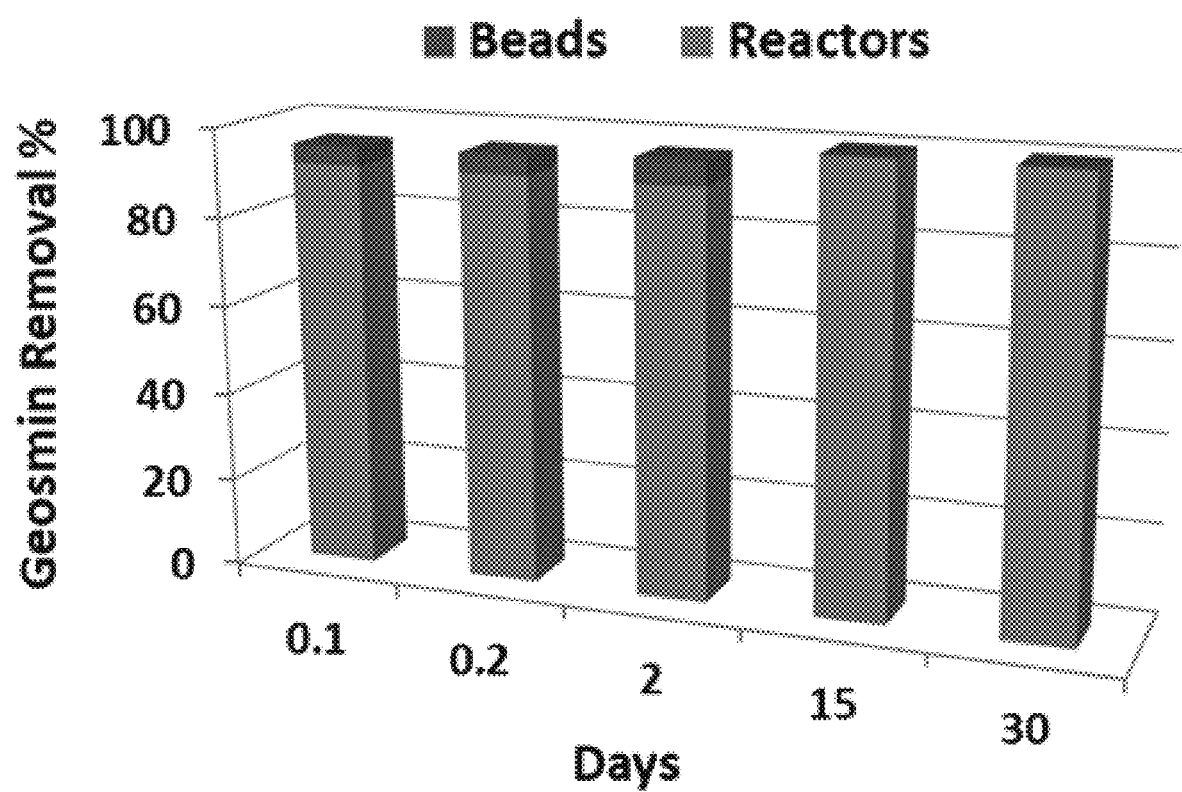
FIG. 13B depicts removal of Geosmin from a purge tank of recirculating seawater system at Mote Marine Laboratory after treatment with the current system.

The system was able to treat 629 mL/min and after 30 days of continuous operation the water in the seawater purge tank was off-flavors free, with concentrations below limit of detection (see FIGS. 12A-12B (initial concentrations) vs. FIGS. 12C-12D (after system)). Removal percentage equal or higher than 90% was obtained during all evaluated times (FIGS. 13A-13B). See Tables 4-10.

TABLE 4

| Sample | Dilution | MIB | GSM |
|---|---|---|---|
| 1hA1 | 3 | 5.29 | 1.38 |
| 1hA2 | 3 | 4.85 | 1.28 |
| 1hB1 | 3 | 0.39 | 0.13 |
| 1hB2 | 3 | 0.31 | 0.10 |
| 1hC1 | 3 | 0.16 | 0.09 |
| 1hC2 | 3 | 0.24 | 0.03 |
| 2hA1 | 3 | 4.06 | 1.34 |
| 2hA2 | 3 | 5.76 | 1.18 |
| 2hB1 | 3 | 0.45 | 0.08 |
| 2hB2 | 3 | 0.29 | 0.14 |
| 2hC1 | 3 | 0.13 | 0.03 |
| 2hC2 | 3 | 0.14 | 0.07 |
| 2dA1 | 3 | 4.80 | 1.22 |
| 2dB1 | 1 | 0.32 | 0.10 |
| 2dC1 | 1 | 0.10 | 0.04 |
| 2wA1 | 1 | 2.62 | 0.52 |
| 2WA2 | 1 | 2.49 | 0.40 |
| 2WB1 | 1 | 0.03 | 0.00 |
| 2WB2 | 1 | 0.02 | 0.00 |
| 2WC2 | 1 | 0.00 | 0.00 |
| 2WC1 | 1 | 0.01 | 0.00 |
| M1A1 | 1 | 1.41 | 0.15 |
| M1A2 | 1 | 1.95 | 0.06 |
| M1B1 | 1 | 0.02 | 0.00 |
| M1B2 | 1 | 0.01 | 0.00 |
| M1C1 | 1 | 0.02 | 0.00 |
| M1C2 | 1 | 0.00 | 0.00 |

TABLE 5

| | Location | average MIB | | Location | average GSM |
|---|---|---|---|---|---|
| 1 h | A | 5.07 | 1 h | A | 1.33 |
| | B | 0.35 | | B | 0.11 |
| | C | 0.20 | | C | 0.06 |
| 2 h | A | 4.91 | 2 h | A | 1.26 |
| | B | 0.37 | | B | 0.11 |
| | C | 0.14 | | C | 0.05 |
| 2 d | A | 4.80 | 2 d | A | 1.22 |
| | B | 0.32 | | B | 0.10 |
| | C | 0.10 | | C | 0.04 |
| 2 w | A | 2.56 | 2 w | A | 0.46 |
| | B | 0.02 | | B | 0.00 |
| | C | 0.01 | | C | 0.00 |
| 1 M | A | 1.68 | 1 M | A | 0.11 |
| | B | 0.01 | | B | 0.00 |
| | C | 0.01 | | C | 0.00 |

TABLE 6

| | average MIB | | | | |
|---|---|---|---|---|---|
| Location | 1 h | 2 h | 2 d | 2 w | 1 M |
| A | 5.07 | 4.91 | 4.80 | 2.56 | 1.68 |
| B | 0.35 | 0.37 | 0.32 | 0.02 | 0.01 |
| C | 0.20 | 0.14 | 0.10 | 0.01 | 0.01 |

TABLE 6-continued

| | average MIB | | | | |
|---|---|---|---|---|---|
| | | | days | | |
| Location | 0.1 | 0.2 | 2 | 15 | 30 |
| A | 5.07 | 4.91 | 4.80 | 2.56 | 1.68 |
| B | 0.35 | 0.37 | 0.32 | 0.02 | 0.01 |
| C | 0.20 | 0.14 | 0.10 | 0.01 | 0.01 |

TABLE 7

| | average GSM | | | | |
|---|---|---|---|---|---|
| Location | 1 h | 2 h | 2 d | 2 w | 1 M |
| A | 1.33 | 1.26 | 1.22 | 0.46 | 0.11 |
| B | 0.11 | 0.11 | 0.10 | 0.00 | 0.00 |
| C | 0.06 | 0.05 | 0.04 | 0.00 | 0.00 |

| | average GSM | | | | |
|---|---|---|---|---|---|
| | | | days | | |
| Location | 0.1 | 0.2 | 2 | 15 | 30 |
| A | 1.33 | 1.26 | 1.22 | 0.46 | 0.11 |
| B | 0.11 | 0.11 | 0.10 | 0.00 | 0.00 |
| C | 0.06 | 0.05 | 0.04 | 0.00 | 0.00 |

TABLE 8

| | removal % | | | | |
|---|---|---|---|---|---|
| | MIB | | | | |
| Location | 1 h | 2 h | 2 d | 2 w | 1 M |
| reactors | 93.15 | 92.45 | 93.32 | 99.16 | 99.16 |
| R + B | 96.02 | 97.22 | 97.88 | 99.74 | 99.50 |
| Beads | 2.87 | 4.77 | 4.56 | 0.58 | 0.34 |

| | removal % | | | | |
|---|---|---|---|---|---|
| | MIB | | | | |
| | | | days | | |
| Location | 0.1 | 0.2 | 2 | 15 | 30 |
| Reactors | 93.15 | 92.45 | 93.32 | 99.16 | 99.16 |
| Beads | 2.87 | 4.77 | 4.56 | 0.58 | 0.34 |

TABLE 9

| | removal % | | | | |
|---|---|---|---|---|---|
| | GSM | | | | |
| Location | 1 h | 2 h | 2 d | 2 w | 1 M |
| reactors | 91.37 | 91.48 | 91.46 | 99.57 | 99.59 |
| R + B | 95.58 | 95.86 | 97.00 | 99.92 | 99.78 |
| Beads | 4.22 | 4.38 | 5.54 | 0.35 | 0.19 |

| | removal % | | | | |
|---|---|---|---|---|---|
| | GSM | | | | |
| | | | days | | |
| Location | 0.1 | 0.2 | 2 | 15 | 30 |
| Reactors | 91.37 | 91.48 | 91.46 | 99.57 | 99.59 |
| Beads | 4.22 | 4.38 | 5.54 | 0.35 | 0.19 |

TABLE 10

| | MIB | | | | days |
|---|---|---|---|---|---|
| | 0.1 | 0.2 | 2 | 15 | 30 |
| A | 5.07 | 4.91 | 4.80 | 2.56 | 1.68 |
| C/Co | 1.00 | 0.97 | 0.95 | 0.50 | 0.33 |
| C | 0.20 | 0.14 | 0.10 | 0.01 | 0.01 |
| C/Co | 1.00 | 0.68 | 0.50 | 0.03 | 0.04 |

| | average GSM | | | | days |
|---|---|---|---|---|---|
| Location | 0.1 | 0.2 | 2 | 15 | 30 |
| A | 1.33 | 1.26 | 1.22 | 0.46 | 0.11 |
| C/Co | 1.00 | 0.95 | 0.91 | 0.35 | 0.08 |
| C | 0.06 | 0.05 | 0.04 | 0.00 | 0.00 |
| C/Co | 1.00 | 0.89 | 0.62 | 0.01 | 0.00 |

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method of degrading 1,10-dimethyl-trans-9-decalol and 2-methylisoborneol in water in a recirculating aquaculture system, comprising:
    delivering a fluid from a reservoir to an inlet disposed within a housing of an aquaculture reacting canister, wherein the aquaculture reacting canister includes:
        a transparent optical fiber, wherein a photo-catalyst coating is applied to the transparent optical fiber, using a slurry-spray coating process, thereby preventing the photo-catalyst from leaching into an environment surrounding the transparent optical fiber;
        a plasmonic layer disposed between the transparent optical fiber and the photo-catalyst coating when the photo-catalyst coating is applied to the transparent optical fiber;
    aligning the coated transparent optical fibers in the aquaculture reacting canister;
    actuating the water to flow through the aquaculture reacting canister wherein the transparent optical fiber is arranged such that a surface area of the photo-catalyst is maximized, thereby increasing the degradation of 1,10-dimethyl-trans-9-decalol and 2-methylisoborneol via an advanced oxidation process when an ultraviolet light is passed through the transparent optical fiber; and
    returning the fluid exiting through an outlet disposed within the housing of the reacting canister to the reservoir, thereby preserving the freshness and decreasing the harvesting time of fish.

2. The method of claim 1, wherein the plasmonic layer includes yttrium aluminum garnet nanoparticles.

3. The method of claim 1, wherein the photo-catalyst is $TiO_2$.

4. The method of claim 1, wherein the transparent optical fiber is packed and intercalated with an uncoated transparent optical fiber.

5. The method of claim 1, wherein the method further includes actuating the water to flow through a bead column, the bead column including a cactus mucilage in fluid communication with the fluid exiting the aquaculture reacting canister through the outlet, whereby the 1,10-dimethyl-trans-9-decalol and 2-methylisoborneol are further removed from the fluid.

6. The method of claim 1, having two or more aquaculture reacting canisters connected in parallel.

7. The method of claim 1, having two or more aquaculture reacting canisters connected in series.

8. The method of claim 1, wherein the aquaculture reacting canister further includes baffles to support the transparent optical fiber and restrict the fluid flow through the aquaculture reacting canister, thereby increasing the contact time between the fluid and the photo-catalyst.

9. The method of claim 1, wherein the ultraviolet light is a fluorescent black light blue bulb, whereby photons emitted from the fluorescent black light blue bulb react with the photo-catalyst, thereby removing 1,10-dimethyl-trans-9-decalol and 2-methylisoborneol from the fluid.

10. The method of claim 1, wherein the reacting canister further includes a light reflective housing, thereby maximizing the number of photons reacting with the photo-catalyst.

11. The method of claim 1, wherein the entire portion of the optical fiber within aquaculture reacting canister is coated with the photo-catalyst.

12. The method of claim 1, wherein the coated transparent optical fiber located in the aquaculture reacting canister is packed and intercalated with an uncoated transparent optical fiber.

* * * * *